United States Patent [19]

Minasian

[11] Patent Number: 4,698,836
[45] Date of Patent: Oct. 6, 1987

[54] MEANS AND TECHNIQUES USEFUL IN MARKING X-RAY FILM

[76] Inventor: John L. Minasian, 2319 W. Magnolia Blvd., Burbank, Calif. 91506

[21] Appl. No.: 895,328

[22] Filed: Aug. 11, 1986

Related U.S. Application Data

[63] Continuation-in-part of Ser. No. 664,327, Oct. 24, 1984, abandoned.

[51] Int. Cl.[4] .............................................. G03B 42/02
[52] U.S. Cl. .................................... 378/162; 378/165; 378/205
[58] Field of Search ................ 378/162, 165, 205, 207

[56] References Cited

U.S. PATENT DOCUMENTS

| | | | |
|---|---|---|---|
| 1,168,177 | 1/1916 | Yoanna | 378/165 |
| 1,912,464 | 6/1933 | Powers | 378/165 |
| 2,162,420 | 6/1939 | Buckley | 378/165 |
| 3,560,745 | 2/1971 | Petersen | 378/162 |
| 3,591,804 | 7/1971 | Minasian | 378/165 |
| 4,035,653 | 7/1977 | Karasko | 378/165 |
| 4,058,733 | 11/1977 | Stenbel | 378/165 |
| 4,194,625 | 3/1980 | Stievenart et al. | 378/165 |
| 4,426,723 | 1/1984 | Rouse | 378/165 |

Primary Examiner—Janice A. Howell
Assistant Examiner—David Porta
Attorney, Agent, or Firm—Frank E. Mauritz

[57] ABSTRACT

An X-ray film marking device is quickly attachable to and detachable from an X-ray film cassette using a block of magnet material which is X-ray opaque but if formed with two X-ray transparent cavity portions. One cavity portion is L-shaped to cause a black L recording on a white background. A second cavity portion is R-shaped to cause a black R recording on a white background. A door of X-ray opaque material is adjustably positioned over either cavity portion and has magnetizable material cooperating with the magnet material to safely lock the door in its adjusted positions. The cavity portions are filled with different color X-ray transparent material for contrast. The magnet material includes a third cavity portion which is dish shaped for confining a ball that is free to move to a position therein depending upon the orientation of the X-ray cassette upon which the marker is mounted.

3 Claims, 5 Drawing Figures

MEANS AND TECHNIQUES USEFUL IN MARKING X-RAY FILM

The present patent application is a continuation in part of my co-pending application Ser. No. 664,327, filed Oct. 24, 1984 now abandoned.

The present invention relates to means and techniques for marking X-ray film contemporaneously with its exposure.

The marker device is preferably of magnet material so that it may self-adhere to a magnetizable portion of an X-ray film cassette in all possible orientations of the cassette when the film therein is being exposed during the taking of a picture of a patient in one of his or her various positions. Contemporaneously with such exposure the marker device causes certain valuable information to be recorded on the same film as to the position of the patient, i.e. the particular view taken of the patient.

An object of the present invention is to provide an improved marker device of the character mentioned and having the features described.

A specific object of the present invention is to provide a marker of this character which is self contained in that it provides easy and quick adjustment for identification of either L (left or R (right) side of the body.

Another specific object of the present invention is to provide a marker of this character which incorporates a ball and dish combination in which the ball is free to move for indicating various views such as: (1) Upright view (ball at 6 O'clock) or standing position, (2) Trendelenburg view (ball at 12 O'clock) in which the patient's head is lower than his feet, (3) Right side view (ball at 9 O'clock), (4) Left side view (ball at 3 O'clock), (5) other possible views at 45 degrees of the above views, etc., (6) Flat view, (ball resting in center of dish), patient resting on his back or abdomen.

Another specific object of the present invention is to provide an improved marker of simple compact construction that produces R and L recordings in black on a white background thereby making them easier to read.

A further object of the present invention is to provide an improved marking device which consists simply of a block of X-Ray opaque material with at least one X-Ray transparent cavity portion shaped therein to provide a black identifying mark on a whit background for easy reading.

Another specific object of the present invention is to provide a marking device as set forth in the preceding paragraph in which the opaque material is magnet material for self-adhering to a cassette.

Still another specific object of the present invention is to provide a marking device of this character in which the X-Ray opaque material is formed with both an L-shaped and an R-shaped X-Ray transparent portion and means are provided for selectively rendering either one of said cavity portions ineffective to produce a corresponding L or R recording.

Another specific object of the present invention is to provide a marking device as set forth in the next preceding object in which the means recited incorporates safety means that prevents its movement from an L or R adjusted position.

Yet another object of the present invention is to provide a new method for making X-ray marking devices.

Features of the present invention which are believed to be novel are set forth with particularity in the appended claims. The invention itself, both as to its organization and manner of operation and method of its construction, together with further objects and advantages thereof, may be best understood by reference to the following description taken in connection with the accompanying drawing in which:

Figure 4:
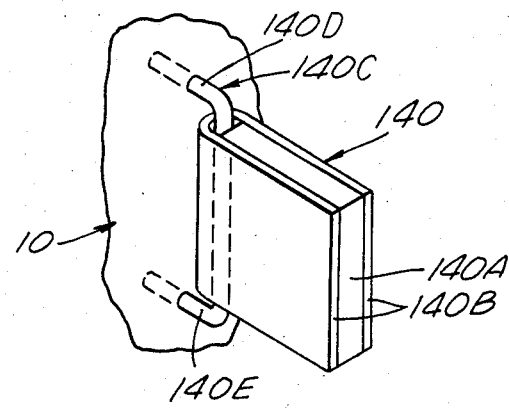
FIG. 4 is a perspective view of a modified door construction which incorporates a safety feature and which preferably, is used as a substitute for the door 40 in FIG. 2.
Figure 1:
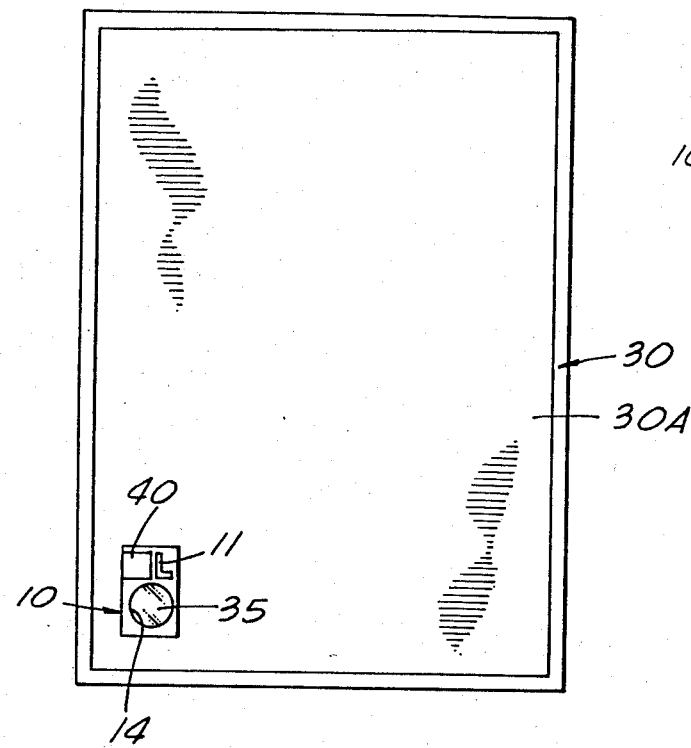
FIG. 1 illustrates a marker device embodying features of the present invention detachably mounted by magnetic forces near, for example the lower left hand corner of a cassette holder containing X-Ray film.

The marker device 10 as illustrated in a rectangular block of magnet material, approximately 11/16 inch by 1 and 1/18 inch long and 7/32 inch thick. That 7/32 inch thickness causes the material to be opaque to X-ray transmission in the direction of that 7/32 inch thickness, i.e. exposure of X-ray film is prevented thereby in which case the X-ray film, when developed provides a white clear background.

The 7/32 inch thick material is processed in accordance with an important feature of the invention, by forming open-ended cavity portions therein, in the direction of its thickness, such that in those regions where the cavity portions exist, the material, if any, that remains is transparent to X-rays. Removal of material produces a change from a basic X-ray opaque condition to an X-ray transparent condition.

Three such X-ray transparent cavity portions 11, 12 and 14 are formed in the otherwise X-ray opaque block 10. A first opening 11 is shaped in the form of and defines the letter L (standing for and for representing the left side of a patient). A second opening 12 is shaped in the form of and defines the letter R (standing for and for representing the right side of a patient). A third opening 14 is in the form of a dish that difines a circular area over which a movable brass ball 15 is free to move to a position depending upon the orientation of the marker device 10, i.e. depending upon the orientation of the X-ray film cassette 30 on which the device 10 is quickly attachably and detachably mounted using magnetic forces developed between the magnetic marker device 10 and a magnetizable portion 30A of cassette 30. This magnetizable portion is a thin layer of iron or steel shim stock which is permanently affixed to the cassette as, for example, by glue.

Figure 3:
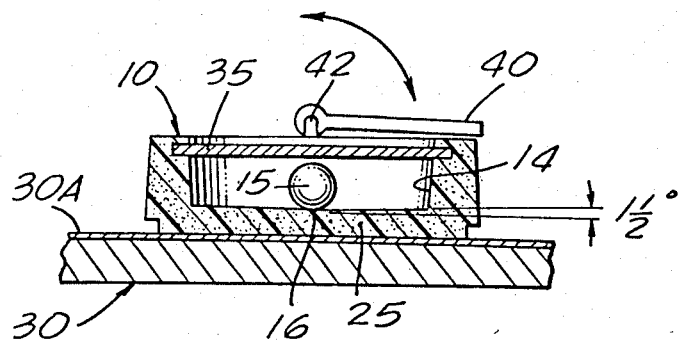
FIG. 3 is a sectional view taken substantially as indicated by the line 3—3 in FIG. 2.
Figure 5:
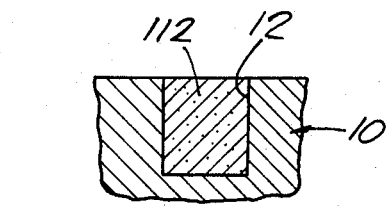
FIG. 5 is a sectional view taken substantially as indicated by the line 5—5 in FIG. 2 of the R cavity portion which however instead of being bare as in FIG. 2 is modified to include an X-ray transparent filler material of contrasting color for better visibilty.

The base portion 25 is preferably tapered upwardly and radially outwardly from the center 16 an amount of approximately one and one half degrees as illustrated in FIG. 3 to assure freedom of movement of ball 15 to the various positions recited above when and as the X-ray cassette is being oriented.

The ball 15 is prevented from leaving the dish-shaped opening 14 by a light transparent plastic cover sheet 35 which allows one to see the resting location of the ball 15 in either its central position or in any one of its peripheral positions.

A door 40 of lead material is hinged on the magnet block 10 using for that purpose a hinge pin 42 of non-magnetizable material such as brass which has its bent ends secured in the magnet block. The door 40 may be adjusted in either one of two positions, namely, a first position overlaying the L shaped cavity portion wherein the lead door 40 prevents the letter L from being recorded on the X-ray film; and a second position overlaying the R cavity wherein only the other letter L is recorded on the X-ray film when and as the X-ray picture of the patient is being taken. For these purposes the frictional forces between the lead door 40 and its hinge pin 42 is sufficient to maintain the door 40 in adjusted position but if desired, more positive means may be provided as described in FIG. 4.

Figure 2:
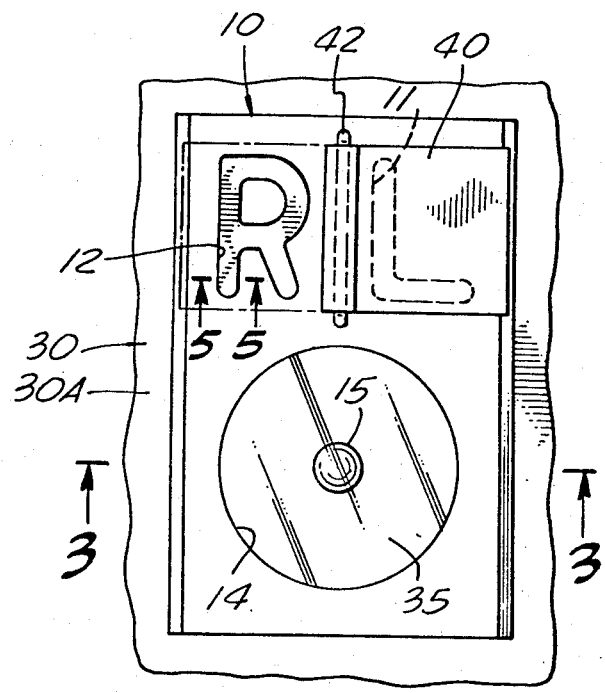
FIG. 2 is a top plan view of the film maker device with a hinged door thereon in a position over the cavity letter L.

In FIG. 4 the door 140, corresponding to the door 40 in FIG. 2 is provided with more positive safety means for maintaining it in either one of its two adjusted positions. The central lead portion 140A is retained by, for example, epoxy glue within a U-shaped holder 140B of magnetizable material such as for example sheet steel or iron. A hinge pin 140C in the form of a staple extends through a space between holder 140B and has its end portions 140D, 140E used to enter the magnet material 10 and be frictionally maintained therein by an operation resembling a stapling operation wherein the end portions 140D, 140E are driven into the magnet material 10 for retention thereby.

This improved door 14 has a safe self-locking feature in that in either one of its two adjusted positions (over either cavity L or over cavity R) the magnetizable holder 140B contacts the magnet material and the door 140 is maintained in positions as a resuslt of the magnetic attraction between the magnet block 10 and holder 140B.

It will be seen that the marker device causes very useful information to be automatically recorded in permanent record form on the patient's X-ray film dependent upon the adjusted position of the door 40 or 140 (FIG. 4) and the self positioning of the ball 15.

The ball 15 is of non magnetizable material, brass or lead so that it is not affected by the magnetism produced by the body of the marker device. The cavity portion 14 is sufficiently deep, i.e. sufficient magnet material is removed in its dish formation to make it sufficiently transparent to record that area over which the ball 15 may located in its various assumable positions. This means that such dish area, which apperas on the developed X-ray film and which provides the background against which the position of the ball is depicted is not completely white and clear (as is the white and clear areas produced where no magnet base material had been removed in production of cavities 11, 12, 14).

The ball material has sufficient density to stop X-rays so that the image of the ball may be cast and cause a distinctive white recording on a darkish background on the X-ray film, however, that white recording of the ball on the dark recording of the dish area is not expected to be as contrasting as a recording of either the black L or R which appears on a clear white background that is produced where there has been no diminution of the 7/32 inch thickness of block 10.

Preferably the cavity portions 11 and 12 have contrasting colors imparted to them by filling them with different colored X-ray transparent materials to make them more readily useable without mistake. For example, the L cavity may be permanently filled with white material and the R cavity with red material to contrast with the dark brown color of the magnet block 10.

While particular embodiments of the present invention have been shown and described, it will be obvious to those skilled in the art that changes and modifications may be made without departing from the invention in its broader aspects and therefore the aim in the appended claims is to cover alll such changes and modifications as fall the true spirit and scope of the invention.

I claim:

1. A marker for quick attachment to and detachment from a cassette containing X-ray film including a single body of material which is sufficiently thick to be opaque to X-rays; said material lhaving two open cavity portions therein extending in the direction of the thickness of said material; one of said cavity portions being sufficiently deep to be X-ray transparent and shaped to produce the image of a first symbol; the other one of said cavity portions being sufficiently deep to be X-ray transparent and shaped to produce an image of a second symbol; an X-ray opaque member; and means mounting said X-ray opaque member on said body for movement from a first position over said first cavity portion to a secod position over said second cavity portion and vice versa; said material having said cavity portions being magnet material for quick attachment to and detachment from the cassette; said opaque member includes magnetizable material which is attracted to and maintained in a locked condition by said magnet material when said opaque member is over either said first or second cavity portion; said magnet material and said opaque member preventing the transmission of X-rays onto the film and thereby assuring the same clear background on which a dark image of either cavity portion is developed on the film.

2. A marker as set forth in claim 1 in which said material has a third transparent cavity portion in the form of a circular dish and a ball of X-ray opaque material free to move therein and cast its image onto X-ray film.

3. In the method of making markers for quick attachment to and detachment from cassettes containing X-ray film, the steps comprising:

providing a material of sufficient thickness such that it is opaque to the transmission of X-rays;

forming two cavity portions therein of reduced thickness such that said cavity portions are transparent to the transmission of said X-rays and produce a dark identifying pattern of said cavity portions on a clear background on exposed and developed X-ray film;

one cavity portion being shaped in the form of and producing an image of the letter L and the other being shaped in the form of and producing an image of the letter R;

said material in which said cavity portions are formed being magnet material such that it may magnetically adhere to an X-ray film cassette for its quick attachment to and detachment therefrom;

movably mounting a door of X-ray opaque material on said magnet material such that said door may be adjustably positioned to cover either one of said cavity portions to thereby prevent that cavity portion covered by said door to produce an image of its shape;

said door being formed at least in part of magnetizable material that is magnetically attracted to and held in a locked condition by said magnet material when said door covers either one of said cavity portions;

the material of said magnet in which said cavity portions are formed and the material of said door each being opaque to thereby prevent the transmission of X-rays.

* * * * *